United States Patent
Culpepper

(10) Patent No.: US 9,857,024 B1
(45) Date of Patent: Jan. 2, 2018

(54) OVERHEAD SUPPORT FOR MEDICAL EQUIPMENT

(71) Applicant: Modular Services Company, Oklahoma City, OK (US)

(72) Inventor: Taylor C. Culpepper, Oklahoma City, OK (US)

(73) Assignee: Modular Services Company, Oklahoma City, OK (US)

( * ) Notice: Subject to any disclaimer, the term of this patent is extended or adjusted under 35 U.S.C. 154(b) by 0 days.

(21) Appl. No.: 15/376,985

(22) Filed: Dec. 13, 2016

Related U.S. Application Data

(63) Continuation of application No. 14/508,038, filed on Oct. 7, 2014, now abandoned, which is a continuation of application No. 13/919,448, filed on Jun. 17, 2013, now abandoned, which is a continuation of application No. 13/853,789, filed on Mar. 29, 2013, now abandoned.

(60) Provisional application No. 61/618,822, filed on Apr. 1, 2012.

(51) Int. Cl.
    *F16M 13/02* (2006.01)

(52) U.S. Cl.
    CPC .......... *F16M 13/027* (2013.01); *F16M 13/02* (2013.01)

(58) Field of Classification Search
    CPC .. A61B 6/0464; A61B 6/4464; F16M 11/425; F16M 13/027; B65G 17/20; F21V 21/34
    USPC ........ 248/58, 279.1, 298.1, 299.1, 317, 323, 248/342, 343; 5/600, 81.1 R, 658, 503.1; 362/404, 33, 804, 239, 405; 52/220.1–220.8, 39
    See application file for complete search history.

(56) References Cited

U.S. PATENT DOCUMENTS

| | | | | |
|---|---|---|---|---|
| 3,431,585 A | * | 3/1969 | Foltz | E05D 15/0652 16/94 D |
| 3,931,452 A | * | 1/1976 | Nilsson | E04H 3/08 174/491 |
| 4,738,369 A | * | 4/1988 | Desjardins | F16M 11/28 211/113 |
| 4,934,933 A | * | 6/1990 | Fuchs | A61G 15/14 312/209 |
| 5,347,431 A | * | 9/1994 | Blackwell | A61B 90/35 362/11 |
| 5,398,359 A | * | 3/1995 | Foster | A61G 7/05 248/922 |

(Continued)

*Primary Examiner* — Jonathan Liu
*Assistant Examiner* — Guang H Guan
(74) *Attorney, Agent, or Firm* — Mary M. Lee

(57) ABSTRACT

An overhead equipment support system for a patient treatment zone, such as an operating room. The support system may comprise an assembly of service hubs interconnected by runway segments to partially or completely circumscribe the treatment zone at the ceiling level while leaving the area immediately above the treatment zone open for other services, such as laminar flow air-handling equipment. An extreme load extension arm may be supported on one or more of the hubs; each such arm is capable of supporting even the heaviest types of medical equipment commonly demanded in surgical suites, especially those supported on booms or articulating arms, thereby greatly increasing the potential operating sphere of each such device. Trolleys are supported on the runway for movement between service hubs. Each trolley can support a medical device in a range of positions around the periphery of the zone as needed by the surgical team.

1 Claim, 18 Drawing Sheets

(56) References Cited

U.S. PATENT DOCUMENTS

| | | | | |
|---|---|---|---|---|
| 5,455,975 A * | 10/1995 | Foster | | A61G 7/05 5/600 |
| D390,968 S * | 2/1998 | Kummerfeld | | D24/232 |
| 6,045,596 A * | 4/2000 | Holland, Jr. | | B01D 46/00 55/385.2 |
| 6,089,518 A * | 7/2000 | Nilsson | | A61G 12/002 248/317 |
| 6,095,468 A * | 8/2000 | Chirico | | F16M 11/2014 248/125.7 |
| 6,096,025 A * | 8/2000 | Borders | | A61F 7/007 606/1 |
| 6,170,102 B1 * | 1/2001 | Kreuzer | | A61G 13/08 5/600 |
| 6,202,360 B1 * | 3/2001 | Rattner | | A61B 50/10 312/209 |
| 6,203,590 B1 * | 3/2001 | Byrd | | B01D 46/0023 55/319 |
| 6,244,733 B1 * | 6/2001 | Fong | | F21V 21/35 362/147 |
| 6,349,436 B1 * | 2/2002 | Kreuzer | | A61G 13/00 5/600 |
| 6,364,268 B1 * | 4/2002 | Metelski | | F16M 11/18 248/278.1 |
| 6,435,698 B1 * | 8/2002 | Schneider | | B61J 1/06 362/233 |
| 6,466,432 B1 * | 10/2002 | Beger | | A61B 50/10 128/920 |
| 6,531,656 B1 * | 3/2003 | Grote | | H02G 3/0493 174/491 |
| 6,568,836 B2 * | 5/2003 | Wahl | | F21V 21/34 248/298.1 |
| 6,629,386 B1 * | 10/2003 | Cornell | | E04L 32/827 160/200 |
| 7,004,437 B2 * | 2/2006 | Bauer | | F16M 11/2014 248/282.1 |
| D528,216 S * | 9/2006 | Korner | | D24/232 |
| 7,191,992 B2 * | 3/2007 | Wagner | | F16M 11/10 248/276.1 |
| 7,219,472 B2 * | 5/2007 | Gallant | | A61G 7/00 248/317 |
| 7,302,775 B2 * | 12/2007 | Olmsted | | G05B 9/02 361/611 |
| 7,581,708 B2 * | 9/2009 | Newkirk | | A61M 16/0051 248/283.1 |
| 7,770,860 B1 * | 8/2010 | Culpepper | | A61G 12/002 248/324 |
| 7,828,252 B2 * | 11/2010 | Parsons | | A61G 15/10 248/125.1 |
| 8,091,849 B2 * | 1/2012 | Ayadhi | | F16F 15/08 248/317 |
| 8,172,435 B2 * | 5/2012 | Spiro | | F21S 2/00 362/147 |
| 8,967,573 B2 * | 3/2015 | Hemmer | | F16M 13/00 248/317 |
| 9,149,350 B2 * | 10/2015 | Ahearn | | A61C 19/00 |
| 2008/0016712 A1 * | 1/2008 | Van | | A45D 20/12 34/283 |
| 2012/0281812 A1 * | 11/2012 | Noda | | A61L 36/4233 378/62 |

* cited by examiner

OVERHEAD SUPPORT FOR MEDICAL EQUIPMENT

CROSS-REFERENCE TO RELATED APPLICATIONS

This application is continuation of co-pending application Ser. No. 14/508,038, entitled "Overhead Support for Medical Equipment," filed Oct. 7, 2014, which application is continuation of application Ser. No. 13/919,448, entitled "Overhead Support for Medical Equipment," filed Jun. 17, 2013, which application is continuation of application Ser. No. 13/853,789, entitled "Overhead Support for Medical Equipment," filed Mar. 29, 2013, now abandoned, which application claims the benefit of U.S. provisional application No. 61/618,822 entitled "Overhead Rail System for Surgical Suite," filed Apr. 1, 2012. The contents of these applications are incorporated herein by reference.

FIELD OF THE INVENTION

The present invention relates to generally mounting systems for medical and surgical equipment and more particularly but without limitation to equipment for mounting equipment from the ceiling in surgical suites.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawing merely illustrates a preferred embodiment of the invention and is not to be construed as limiting the scope of the invention.

DETAILED DESCRIPTION OF THE PREFERRED EMBODIMENT(S)

Figure 1:
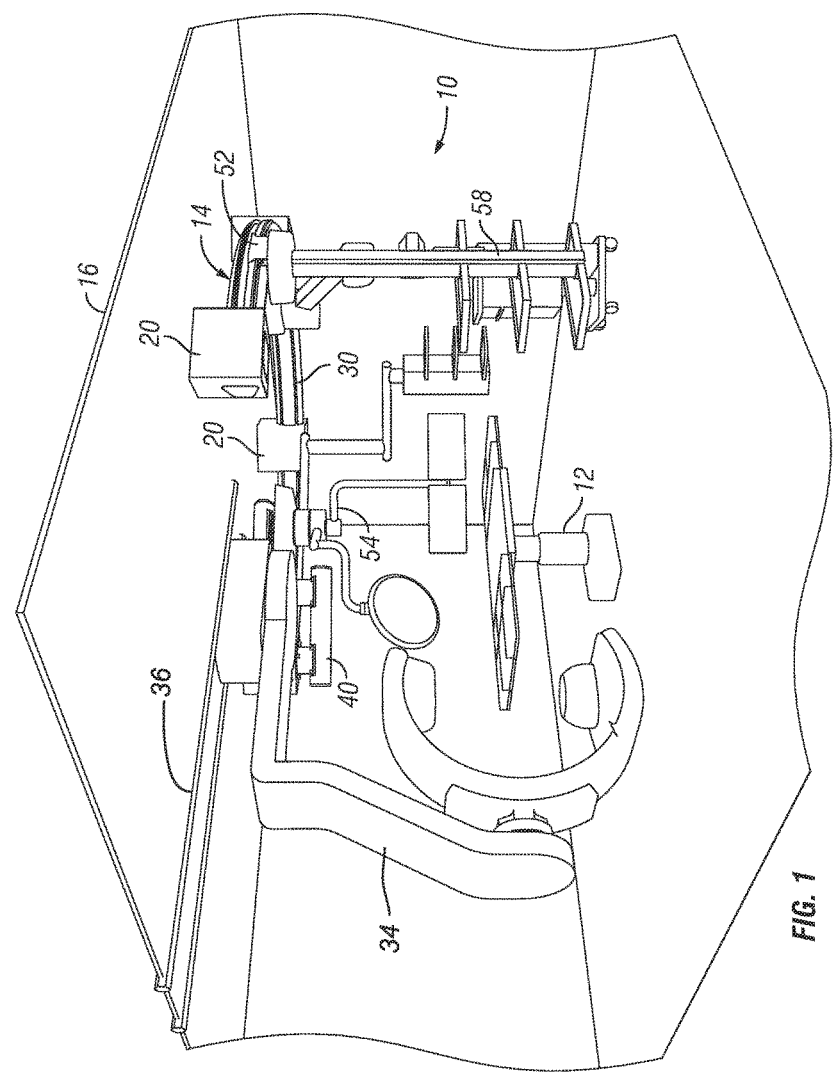
FIG. 1 is a perspective view of an operating room. Installed at the ceiling level is an overhead medical equipment support system made in accordance with a preferred embodiment of the present invention. Various types of medical equipment are shown supported by the system.

The size and complexity of operating rooms in modern health care facilities is increasing. The need for more equipment grows with each advance in technology. There is a growing demand for all types of treatment and diagnostic equipment in or very near the operating zone. The more equipment that is present in the area of the operating table, the less space that is available for staff. Much of this equipment is boom mounted. Many of the items are supported on articulating arms, as infection control policies discourage items touching or mounted on the floor. The space directly over the operating room table often increasingly is occupied by air handling equipment to maintain laminar flow during procedures. This has eliminated the preferred ceiling space typically used in the mounting and placement of large, often very heavy, medical equipment.

The present invention provides an overhead system for adjustably supporting many different types of commonly used medical equipment in a manner that maximizes versatility while leaving open an unobstructed the area immediately over the operating table. The overhead system of this invention offers many advantages. Multiple repositionable platforms are provided for equipment that previously have been ceiling mounted at a stationary location.

The inventive system allows equipment to remain in correct proximity to patient activities while allowing the ceiling space directly above the patient to be utilized for other equipment, such as laminar flow air handling systems that must be directly overhead. The present system provides multiple peripherally spaced support stations that allow larger devices—track-mounted MRI's, CAT scan machines, PET scanning systems, patient lifts, for example—to be moved in and out of the operating zone as needed.

The system of the present invention includes universal mounting plates that permit equipment made by different manufacturers to be mounted with ease. Moreover, the equipment supported by the present system can be repositioned or replaced as need, usually without having to access the structures above the ceiling line. Instead, access to service can be made through the housing of the service hubs.

Still further, the present system includes an extreme duty or extreme load articulating support arm for mounting equipment that includes its own boom or articulating arms. The extreme load extension arm may be supported on one or more of the hubs, and each such arm is capable of supporting even the heaviest types of medical equipment commonly demanded in surgical suites. This particularly advantageous for those types of equipment supported on booms or articulating arms where the boom or articulating arm becomes the load for the extension arm(s). By mounting the device's articulating arm to the mounting system' extreme load arm, the original operational envelope of the device with is compounded with the envelope of the extension arm, thereby greatly increasing the potential operating sphere of each such device. This system provides multiple peripherally placed repositionable platforms that move in a planetary fashion around the operating zone. Additionally, the system allows future expansion of services without necessarily requiring access above the ceiling line.

Non-ceiling mounted equipment also can be supported by this system. Since medical services, such as gas, data, electrical, and the like, are accessible at the service hubs, there is no need for hoses, cables, or cords, that would otherwise be required for such equipment.

As used herein, "medical service" refers to any one of a variety of gas, electrical, or communication services, including but not limited to oxygen, compressed air, nitrogen, too air, vacuum (suction), electricity, telephone, data, and video cable. As used herein, "medical service device" refers to any one of a wide variety of types of equipment that may be used in a medical treatment facility including but not limited to medical service columns, monitors, light fixtures, anesthesia booms, diagnostic equipment, and imaging equipment.

Figure 2:
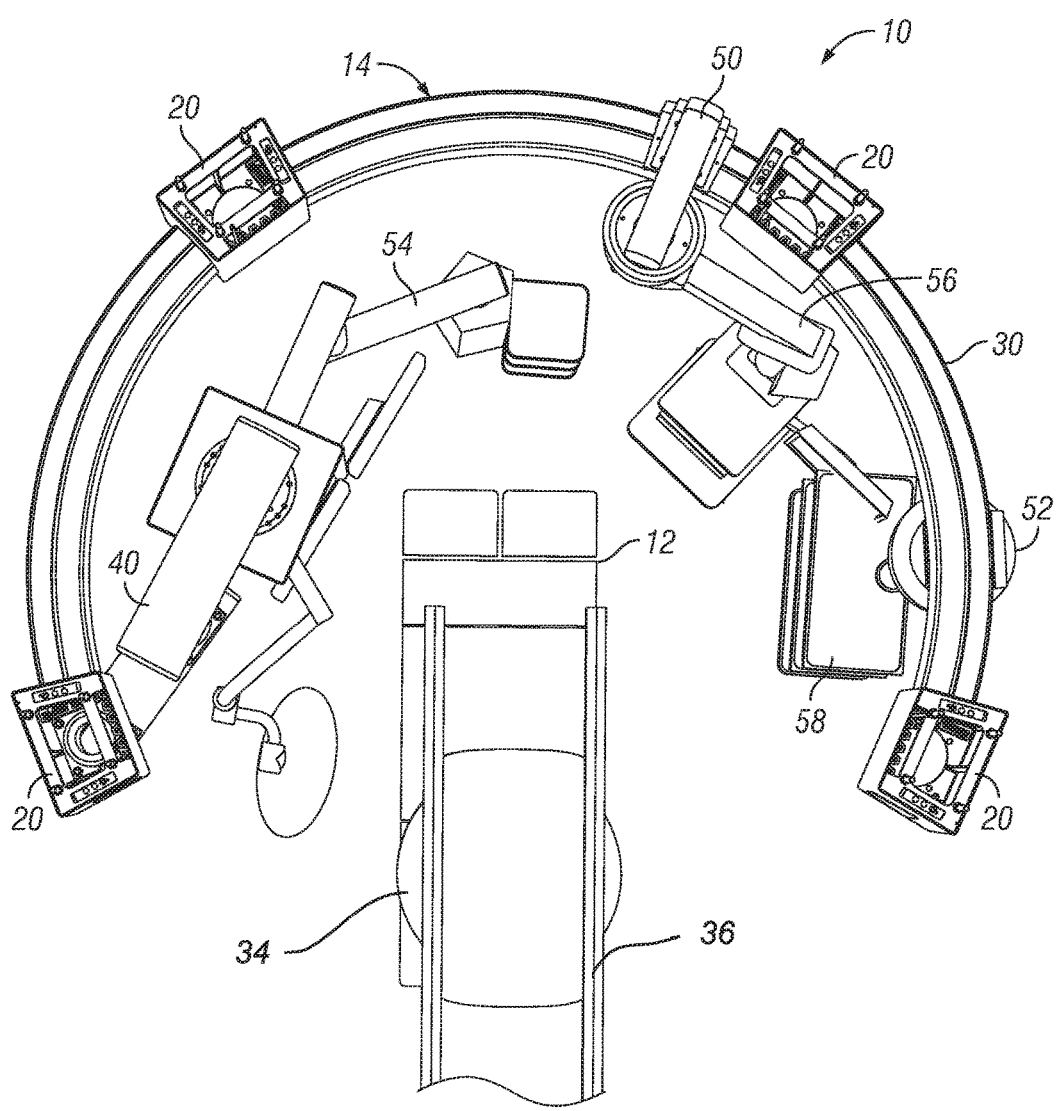
FIG. 2 is an overhead view of the operating room shown in FIG. 1 illustrating how the inventive system partly circumscribes the operating are while leaving the area immediately above the operating table open.

Turning now to the drawings generally and to FIGS. 1 and 2 in particular, there is shown therein a treatment zone designated generally by the reference number 10. In this illustration, the treatment zone is an area in an operating room immediately surrounding the operating table 12. The treatment zone 10 is that area occupied by personnel and equipment while a treatment procedure is being conducted. The overhead equipment support system of the present invention, exemplified by the system 14, may be utilized in other types of treatment zones, such as outpatient treatment areas, clinics, emergency rooms, and the like.

As seen in FIGS. 1 and 2, the overhead system 14 generally circumscribes the treatment zone 10 near the ceiling 16 (FIG. 1). More specifically, the system 14 occupies space around the periphery of the zone 10 below the ceiling 16 but high enough that personnel can walk under the structure to enter and exit the zone.

The system 14 comprises at least one service hub, designated generally by the reference number 20. In most instances, the system 14 will comprises a plurality of hubs. In the system 14 shown in FIGS. 1 and 2, the system 14 comprises four hubs. Extending between hubs 20 are segments of runway 30. In the embodiment shown, the runway segments 30 are curved and there is no connecting segment between one pair of adjacent hubs 20. Thus, the overall structure forms a partial circle. This particular configuration is advantageous because it allows large equipment to be moved in and out of the treatment zone. For example, a computerized axial tomography ("CAT scan") machine 34 that is mounted on ceiling tracks 36 is shown in FIGS. 1 and 2. This machine is not part of the inventive system, but such equipment is often part of a modern surgical suite and the present system easily accommodates this and other equipment frequently encountered in this setting. Other examples include bariatric body lifts and other imaging devices.

Although the above-described C-shaped configuration is advantageous, the configuration of the system 14 may vary. More specifically, the number and arrangement of the hubs and runway segments can vary, as can the shape of the runway segments 30. For example, by using straight runway segments, the structure may be generally square, rectangular, U-shaped or L-shaped. By varying the degree and orientation of curvature in the segments 30, an oval or S-shaped structure may be provided.

Referring still to FIGS. 1 and 2, the most preferred system 14 will include one or more extension arms, exemplified by the arm 40. For example, the arm 40 is rotatably mounted from the hub 20. The preferred extension arm is built to support the heavier items of equipment.

Still further, the preferred system 14 includes one or more trolleys that ride on the runway segments 30. More preferably, the runway segments 30 are configured to support both upper and lower trolley assemblies, designated generally at 50 and 52, respectively. These trolley assemblies 50 and 52 may both move bidirectionally and independently on the same runway segment.

In the treatment zone 10 depicted in FIGS. 1 and 2, various medical devices are supported by the system 14. For example, a video screen array 54 is supported on the arm 40. An anesthesia machine 56 is supported on the upper trolley assembly 50, and a typical supply cart 58 is supported on the lower trolley assembly 52. Most of these devices are either rotatably supported on the system 14 or are supported on an integral articulating arm structure. Now it will be apparent how the support platforms of the present invention enhance the maneuverability of these devices and increase the range and sphere of operating locations.

Figure 3:
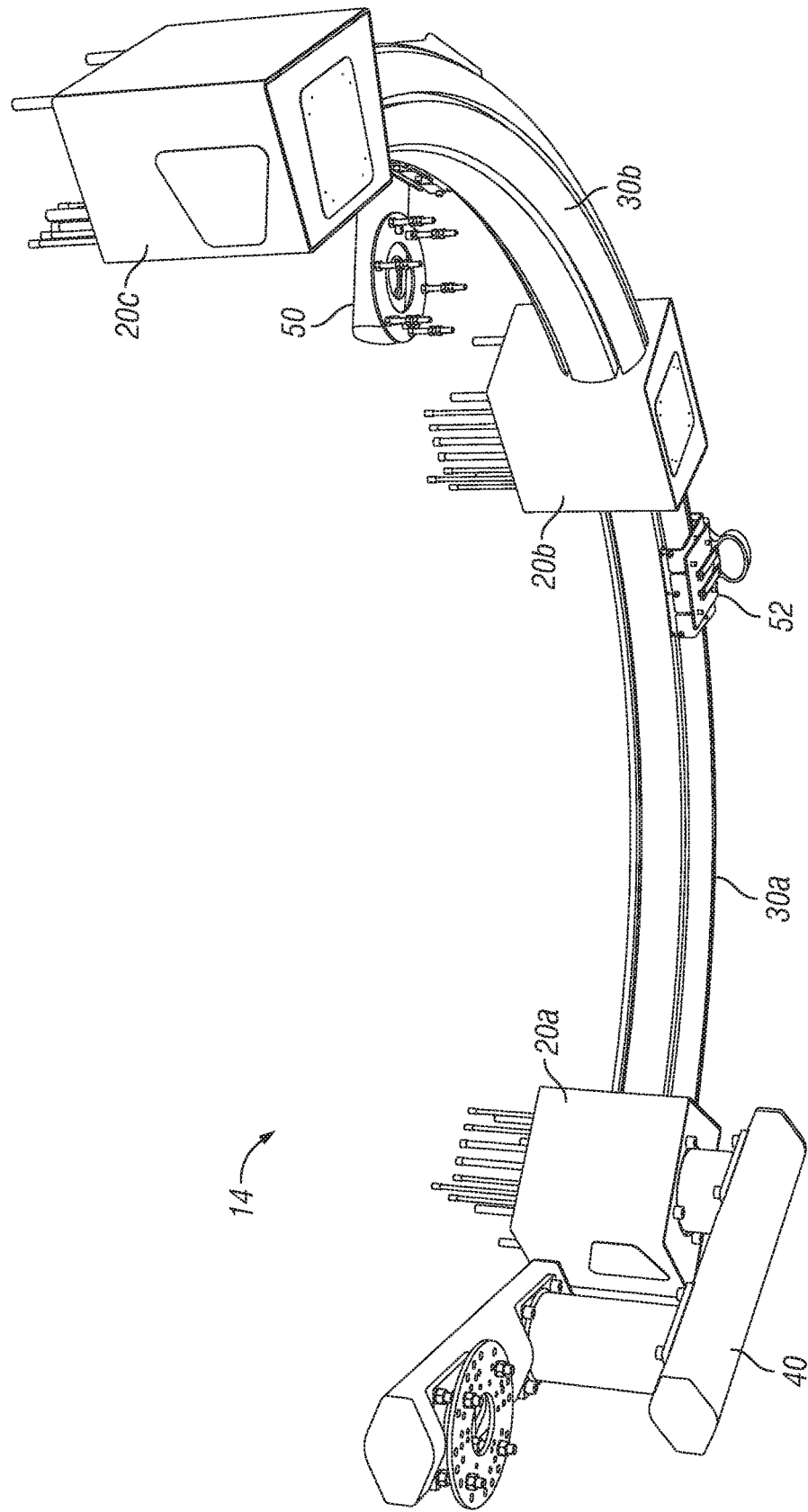
FIG. 3 is a perspective view of another embodiment of the present invention. In this embodiment, the system comprises three service hubs interconnected by two curved runway segments forming a semi-circular support system.

FIG. 3 shows another configuration for the overhead support system. This system 14 comprises three hubs 20 *a*, 20*b*, and 20*c*, structurally interconnected by two curved runway segments 30*a* and 30*b* to form a semi-circular system 14. One extension arm 40 is supported on the hub 20*a*. A lower trolley assembly 52 is supported on the runway segment 30*a*, and an upper trolley assembly 50 rides on the runway segment 30*b*.

Figure 4:
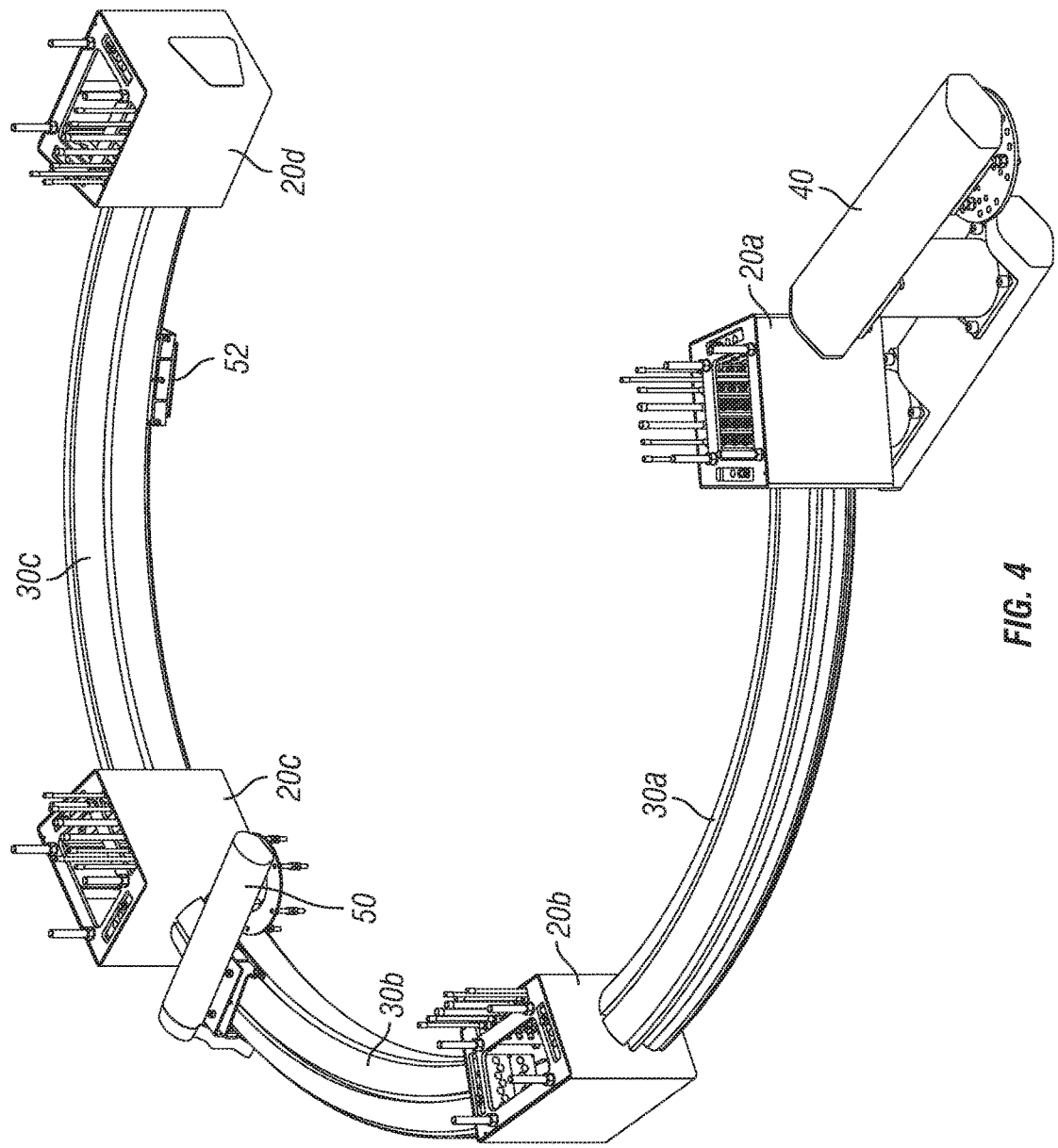
FIG. 4 is a perspective view of another embodiment of the present invention. In this embodiment, the system comprises four service hubs interconnected by three curved runway segments forming a C-shaped support system.

FIG. 4 shows yet another configuration for the overhead support system. This system 14 comprises four hubs 20*a*, 20*b*, 20*c*, and 20*d*, structurally interconnected by three curved runway segments 30*a*, 30*b*, and 30*c* to form a semi-circular system defining an arc of more than 180 degrees. One extension arm 40 is supported on the hub 20*a*. An upper trolley assembly 50 rides on the runway segment 30*b*, and a lower trolley assembly 52 is supported on the runway segment 30*c*.

Figure 5:
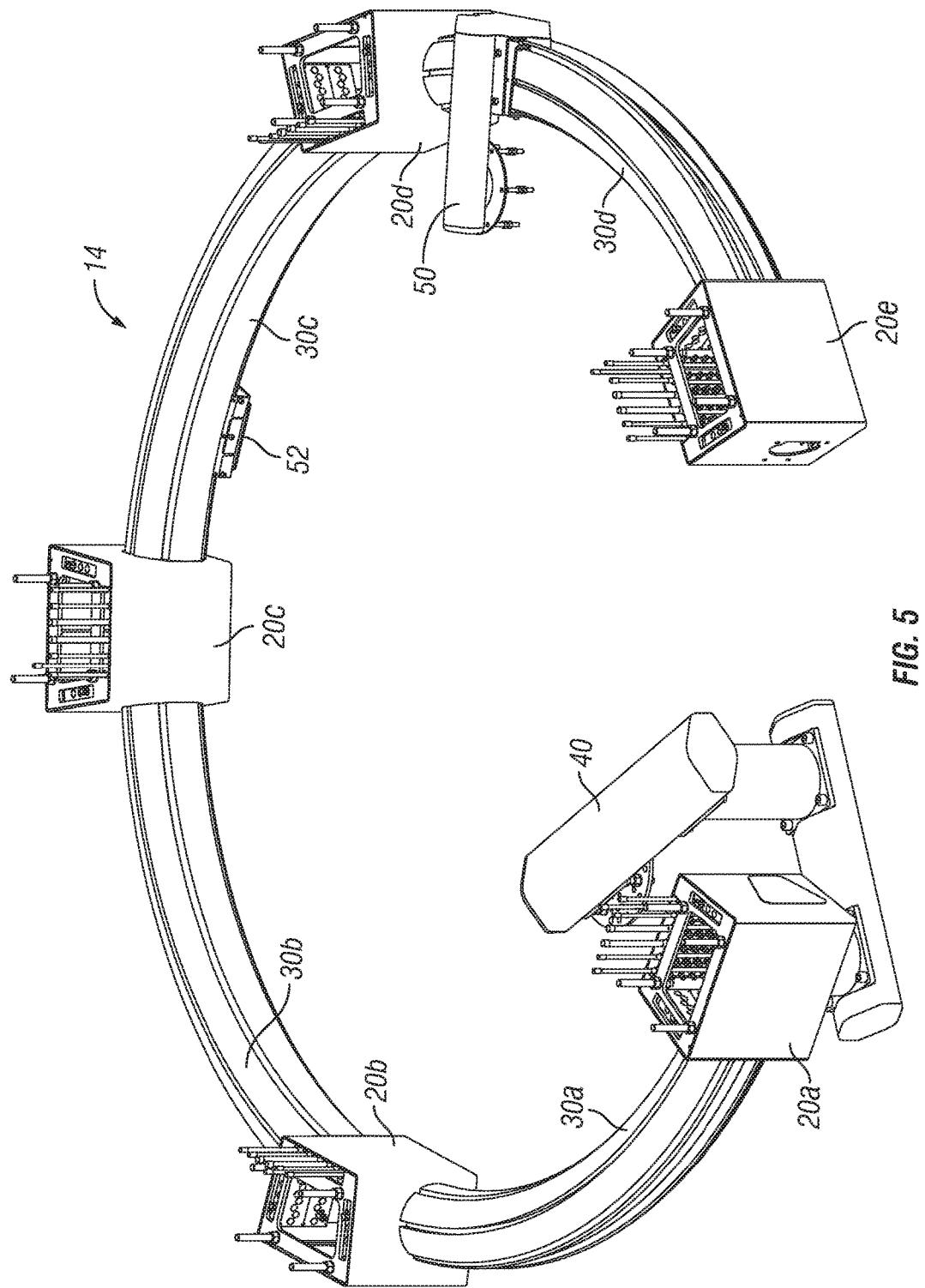
FIG. 5 is a perspective view of another embodiment of the present invention. In this embodiment, the system comprises five service hubs interconnected by four curved runway segments.

FIG. 5 shows still another configuration for the overhead support system. This system 14 comprises five hubs 20a, 20b, 20c, 20d, and 20e, structurally interconnected by four curved runway segments 30a, 30b, 30c, and 30d to form a semi-circular system defining an arc of more than 180 degrees. One extension arm 40 is supported on the hub 20a. An upper trolley assembly 50 rides on the runway segment 30d, and a lower trolley assembly 52 is supported on the runway segment 30c.

Figure 6:
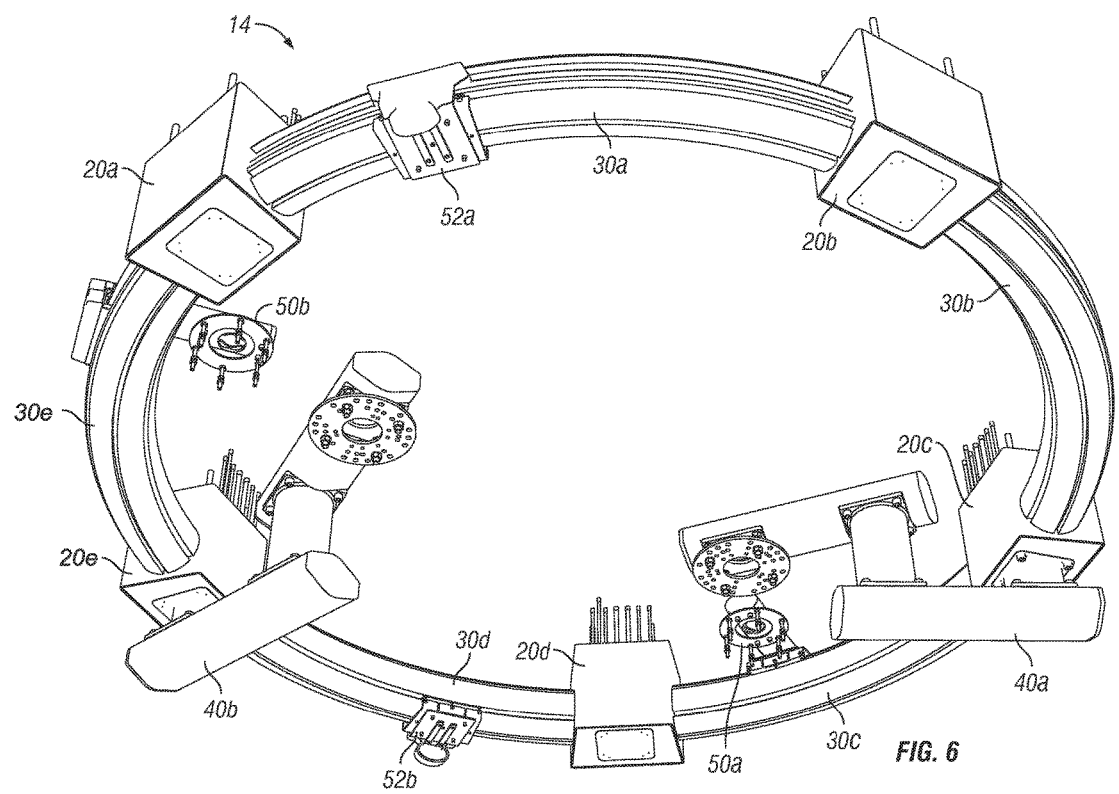
FIG. 6 is a perspective view of another embodiment of the present invention. In this embodiment, the system comprises five service hubs interconnected by five curved runway segments forming a complete circular support system.

A system forming a complete circle is illustrated in FIG. 6. This system 14 comprises five hubs 20a, 20b, 20c, 20d, and 20e, structurally interconnected by five curved runway segments 30a, 30b, 30c, 30d, and 30e to form an enclosed circular system. One extension arm 40a is supported on the hub 20c, and a second extension arm 40b is supported on the hub 20d. An upper trolley assembly 50a rides on the runway segment 30c, and another upper trolley assembly 50b rides on the runway segment 30d. A lower trolley assembly 52a is supported on the runway segment 30a, and a second lower trolley assembly 52b rides on the runway segment 30d.

Figure 7:
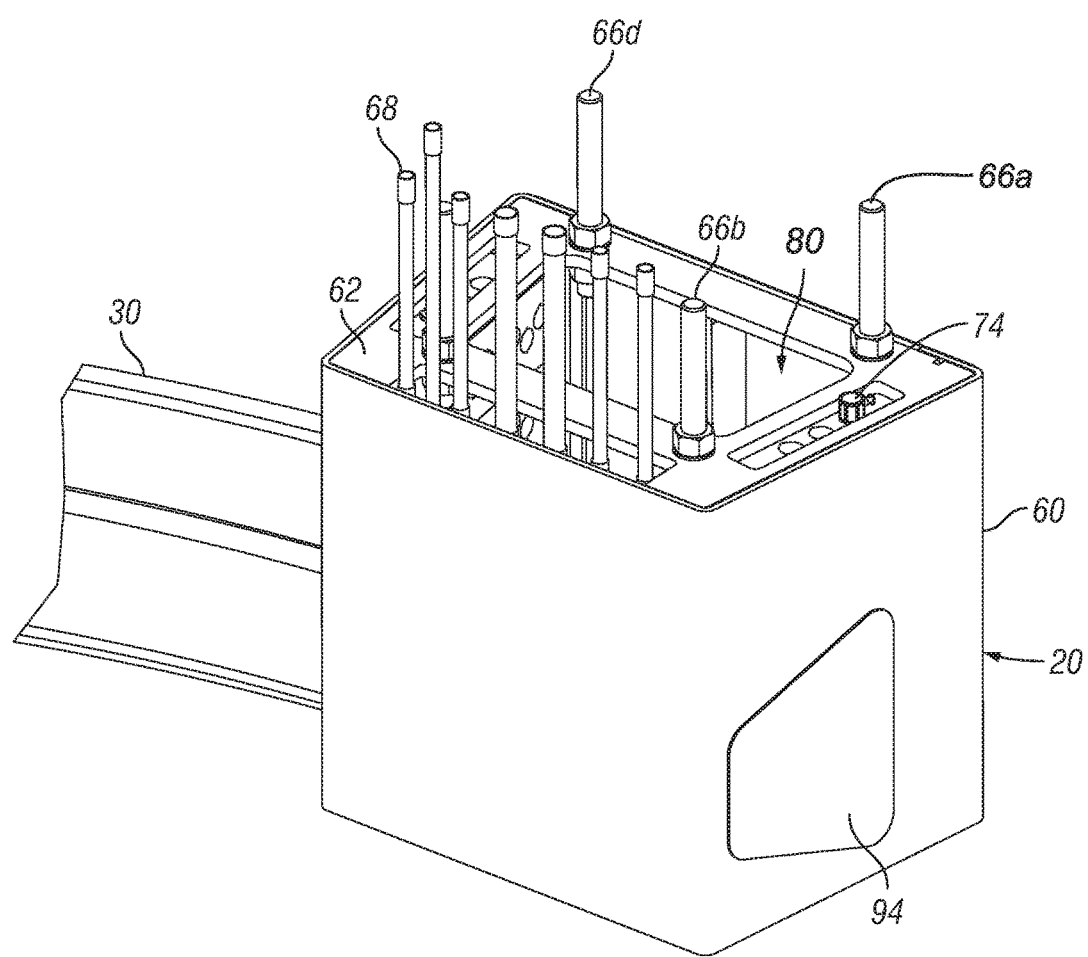
FIG. 7 is an enlarged perspective view of a service hub as seen from the inside of the system and showing various medical service conduits extending through the top of the housing.
Figure 8:
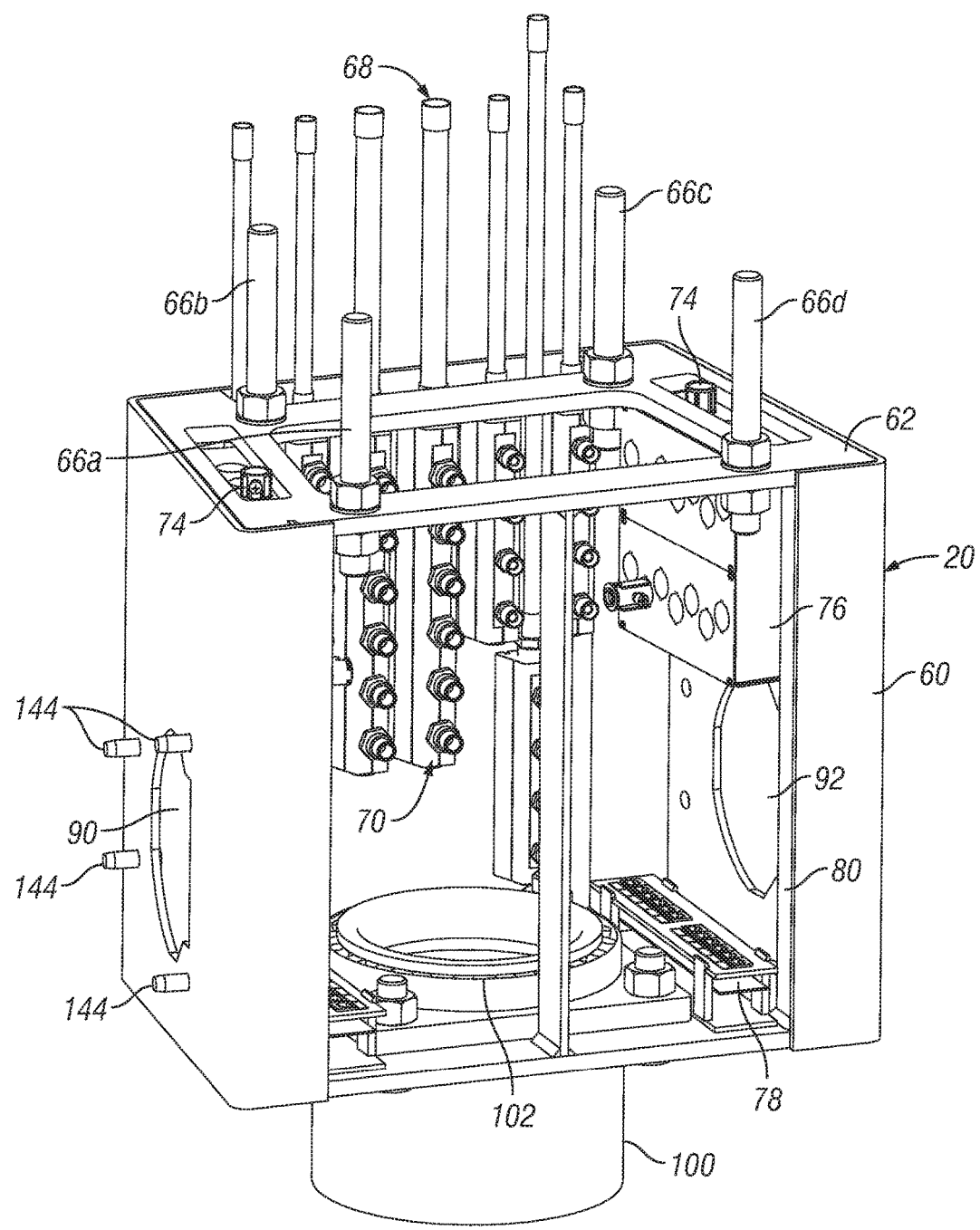
FIG. 8 is another enlarged perspective view of the service hub as seen from the outside of the system. The access panel is removed to show the open service ports on each side. Also shown in this view is a hub adapter rotatably mounted at the bottom of the housing.
Figure 9:
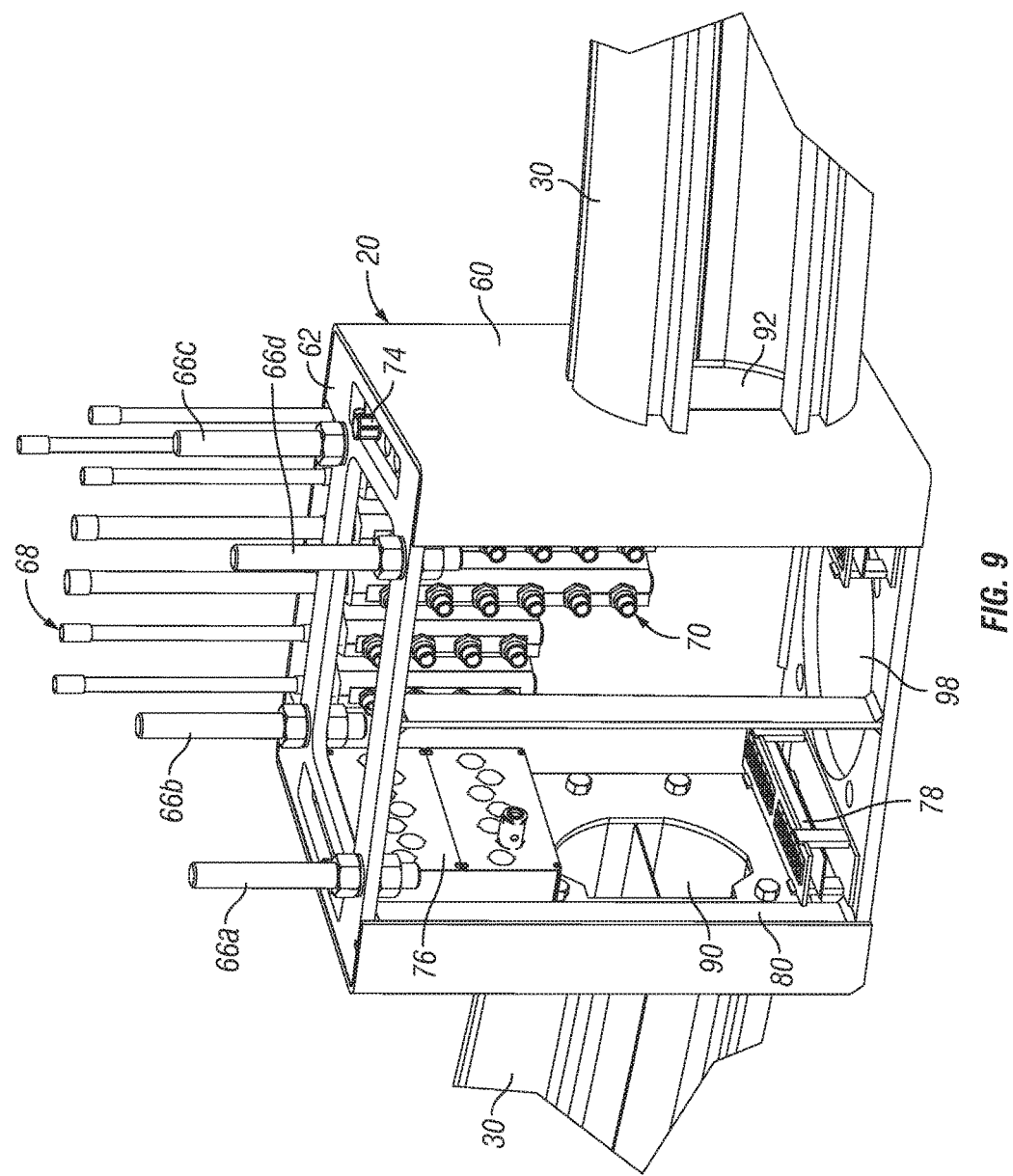
FIG. 9 is yet another view of an open service hub illustrating the attachment of a runway segment to each side service port.

With reference now to FIGS. 7-9, a preferred construction for the service hub 20 now will be described. The hub 20 comprises a housing 60. The shape and size of the hub housing 60 may vary. The shape shown in these drawings is not limiting. The housing 60 may be formed of metal and preferably is designed to transfer equipment loads to the building structure. Generally, the housing 6 0 will have an open top 62 which abuts the ceiling (not shown), so that the various medical service conduits can connect to the supply lines in the ceiling space. The hub housing 60 includes a plurality of mounting studs 66a-d by which the housing is connected to the slab or deck above or other superstructure. Medical gas conduits designated generally at 68 connect to medical gas hose connections 70 mounted inside the housing 60. Electrical power connections 74 extend from junction boxes 76 (FIGS. 8&9) mounted inside the housing 60. One or more electrical buses 78 may be included for communication, video, and/or data lines. The housing 60 preferably includes an access opening 80 on one or both sides, and most preferably on the side of the housing facing outwardly. This makes the contents of the housing 60 accessible without having to enter the ceiling space. An easily removable panel or door (not shown) covers the opening 80.

In some instances, a service hub 20 will be used without other hubs or without connecting runways. However, in most cases, a runway segment 30 will connect to one or both ends of the housing 60. To that end, the housing 60 preferably includes service ports 90 and 92, one on each side. Cover plates 94 (FIG. 7) cover the ports 90 and 92 when not in use. As seen in FIG. 9, the bottom of the housing 60 includes a service port 98 for mounting medical service devices (not shown). For example, to attach an extension arm 40 (FIGS. 1&2) or another rotating device, the housing 60 may be equipped with an adaptor collar 100 and a bearing a/or brake assembly 102, seen in FIG. 8. One suitable combination bearing and brake assembly is shown and described in U.S. Pat. No. 7,770,860 entitled "Medical Service System on Articulating Arm with Electromagnetic Brakes," granted Aug. 10, 2010, and the contents of this patent are incorporated herein by reference.

Figure 10:
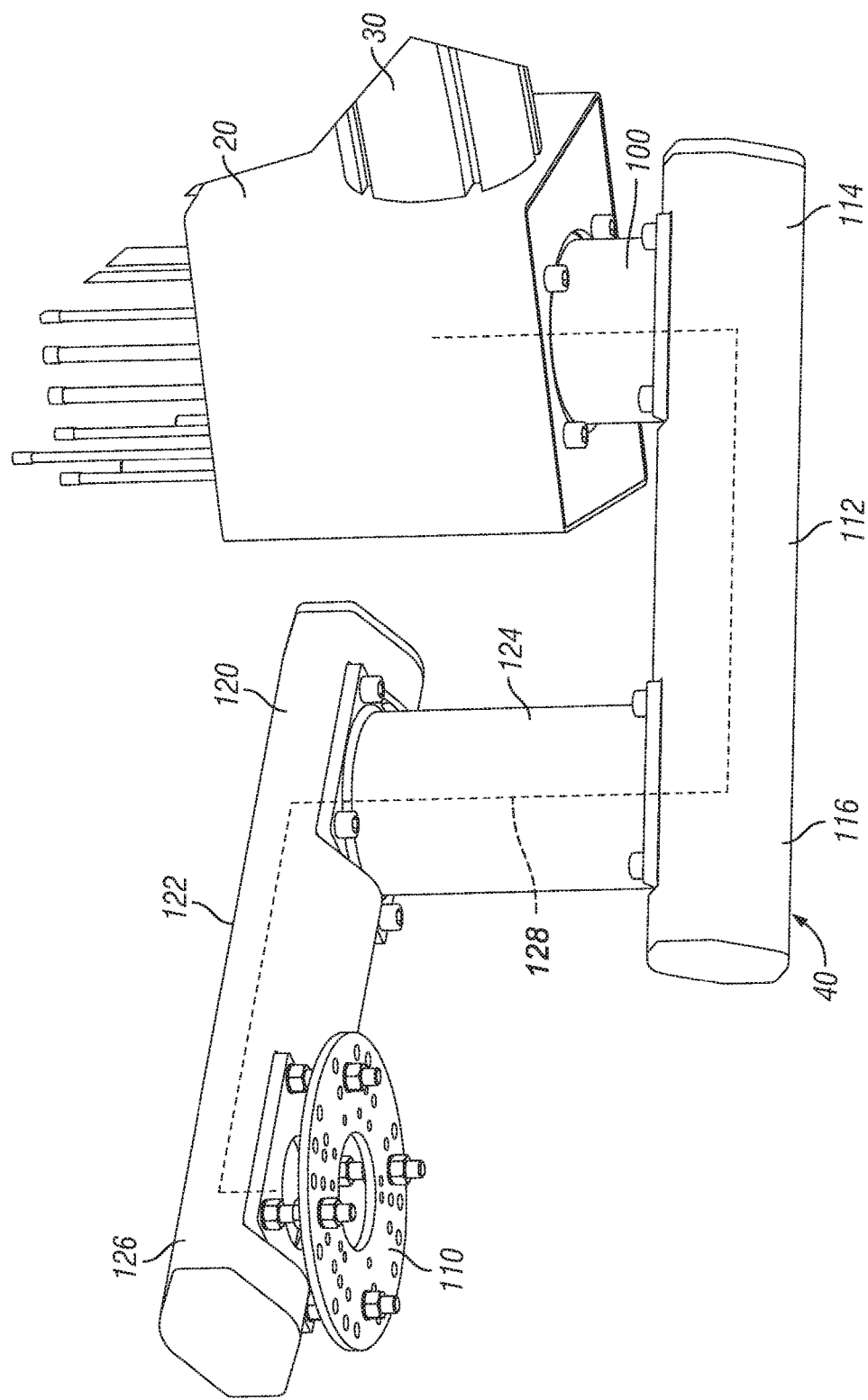
FIG. 10 shows a service hub with an extreme duty extension arm rotatably attached to the bottom of the hub by the adapter. In this embodiment, the extension arm is an articulating two segment assembly.

Turning now to FIG. 10, a preferred extension arm 40 will be described. The extension arm 40. As described above, the service hub 20 may be equipped with a brake and bearing assembly (FIG. 8) for rotatably supporting a rotating device, such as a vertical medical services column. Alternately, the hub 20 may be provided with extension arm to which a medical service device is attached. The extension arm 40 preferably includes a universal attachment member, such as the multipoint attachment plate 110. The plate 110 is designed to permit attachment of medical service devices of many different manufacturers.

The arm 40 may be a single segment arm or a double segment articulating arm, as shown in FIG. 10. Such an arm has a first segment 112 with a proximal end 114 connected to the hub's adapter collar 100. The distal end 116 of the first segment 112 connects to the proximal end 120 of a second segment 122 by means of a connecting collar 124. The collar 124 includes another brake and bearing assembly (not shown), as described in the '860 patent mentioned previously. It should be noted that in the preferred practice, the second segment 122 is mounted to the top of the first segment 112, to provide a higher attachment point for equipment.

The attachment plate 110 may be provided on the distal end 126 of the segment 122. The arm 40 generally and the segments 112 and 122 and collars 100 and 124 all are sized to accommodate a number of service conduits (not shown) that generally follow the path indicated by the broken line 128 to connect to the conduits in the hub 20. Now it will be seen that a rotating device mounted to the attachment plate 110 will be adjustable along three separate vertical axes, the axis of the device itself, the axis of the connector collar 124, and the axis of the hub adapter collar 100. This greatly increases the range or adjustability and the possible operating sphere of the device.

Figure 11:
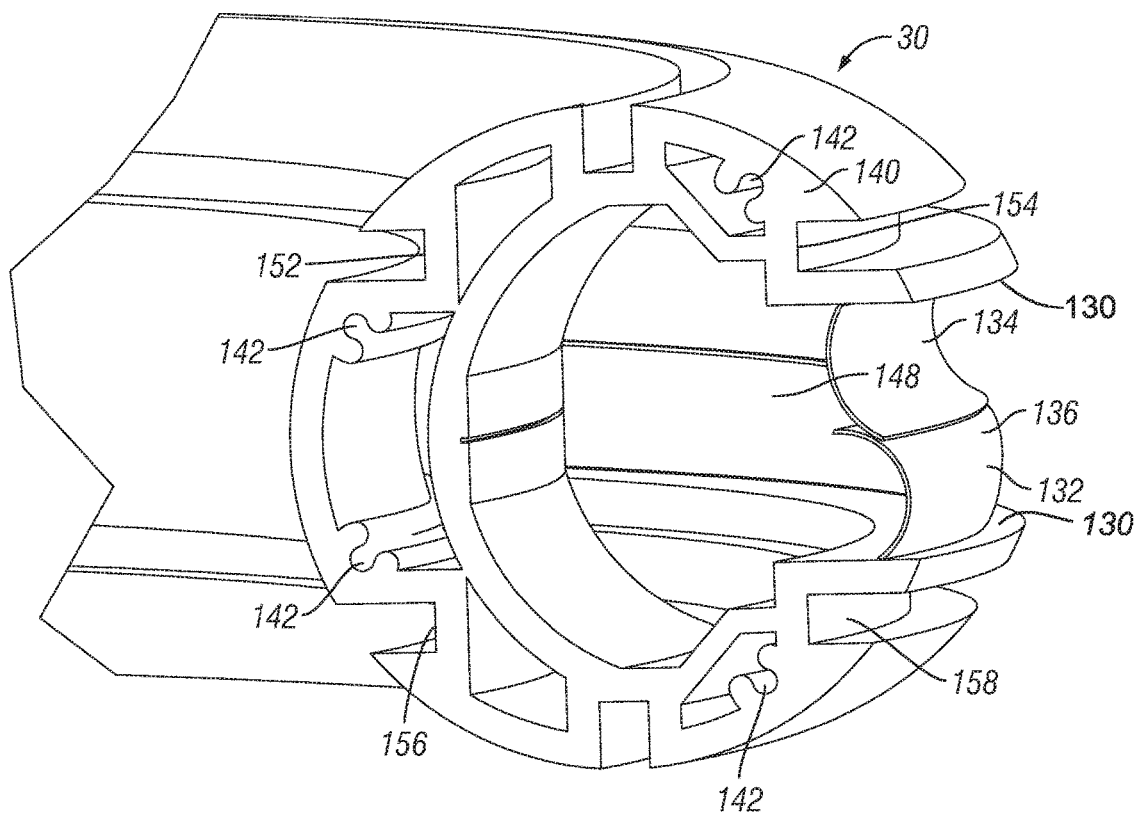
FIG. 11 is an end view of a runway segment showing the upper and lower trolley channels and the internal conduit channel.

With reference now to FIG. 11, a preferred form for the runway segments 30 will be explained. The runway segments 30 structurally connect the service hubs 20, contain the service conduits, and provide a railway or track for the upper and lower trolley assembles 50 and 52. The segments 30 are generally tubular with a circular cross-sectional shape. However, this may vary. A wide slot 130 extends the length of the runway on the outside aspect to allow conduits to connect to the trolleys, in a manner described below. A flexible seal or flap 132 may be included. In the embodiment shown, the seal 132 comprises overlapping upper and lower flap members 134 and 136.

The end face 140 of the runway 30 is provided with bolt bores 142 to receive bolts 144 (FIG. 8) in the sides of the hub housing 60 surrounding each of the side service ports 90 and 92. The loads and moments generated by trollies on one or both runways 30 are transferred through the runway chassis, though the attachment bolts 144 and onto the hub housing 60, which in turn transfers the loads and moments to the building structure via the building structural anchorages or superstructure anchorages to the building. Conduits (not shown) connecting the service conduits in the hub housing 60 pass through the service ports 90 and 92 and extend through the open center 148 of the runway 30, which forms a conduit channel.

Figure 12:
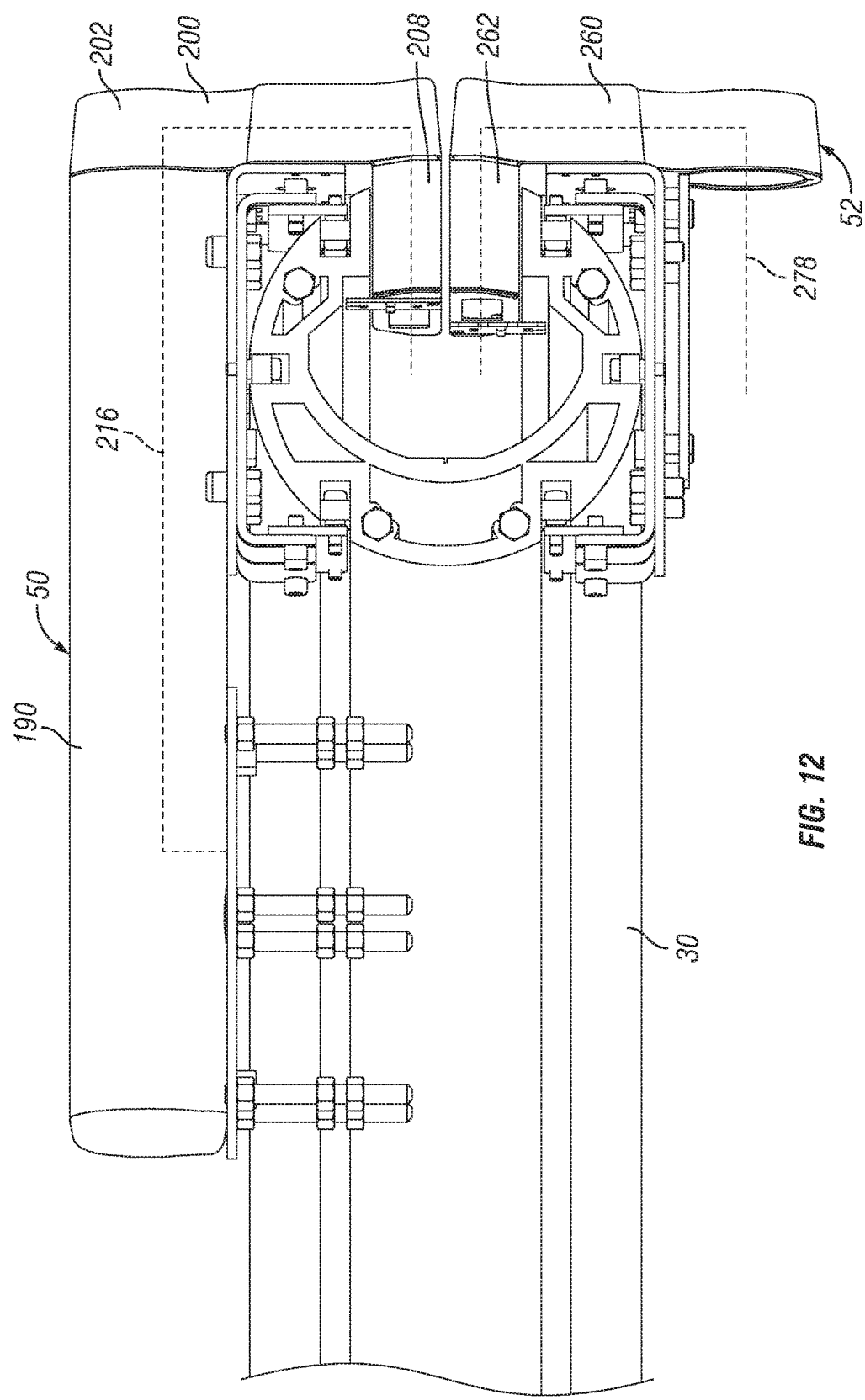
FIG. 12 is an end view of a runway segment showing an upper and lower trolley assemblies positioned thereon.
Figure 13:
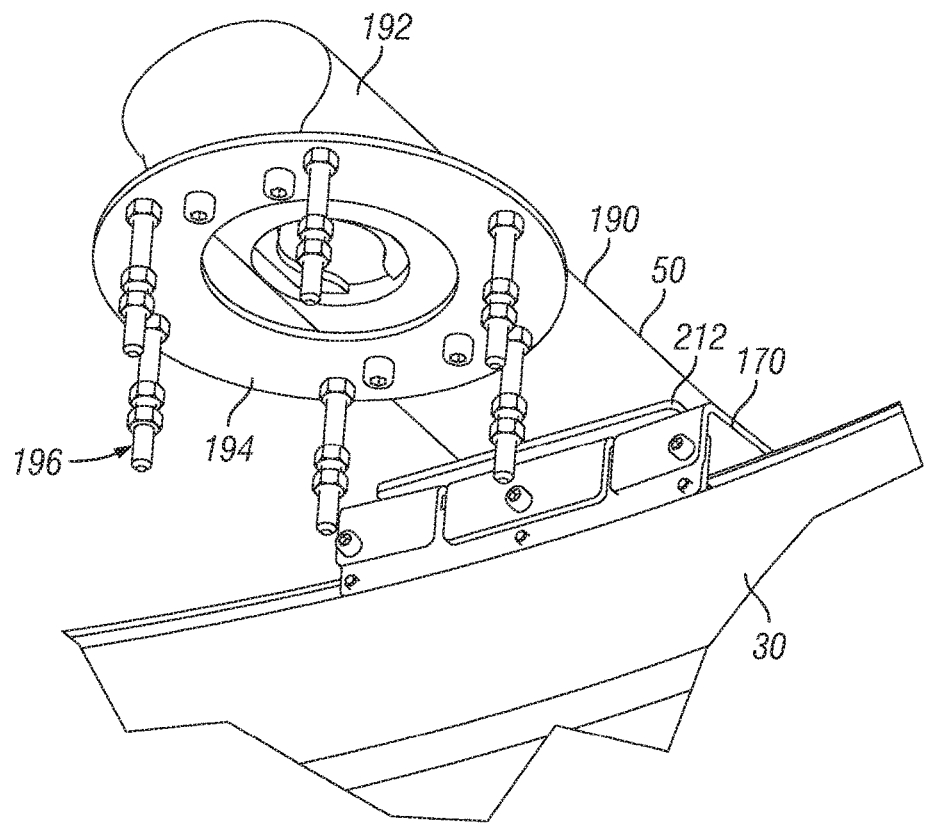
FIG. 13 is a lower perspective view of the upper trolley assembly mounted on the runway and showing the trolley arm and attachment plate extending inward from the runway.
Figure 14:
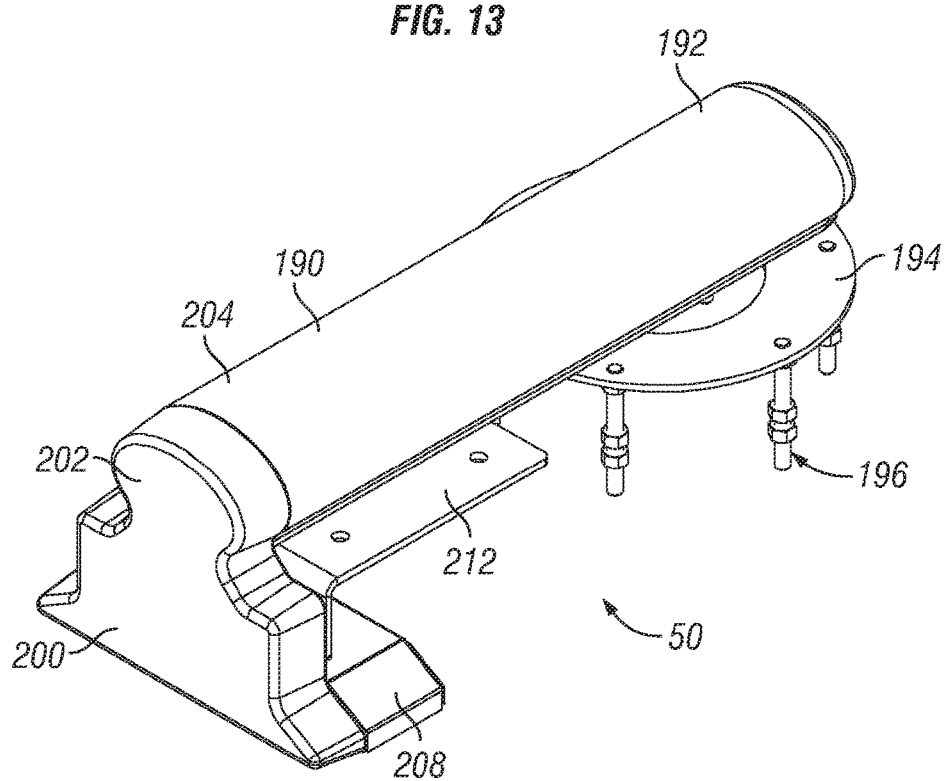
FIG. 14 is an upper perspective view of the upper trolley arm apart from the runway as seen from the outside the zone.

Near the top of the runway 30 is a pair of upper trolley channels 152 and 154. Near the bottom of the runway 30 is a pair of lower trolley channels 156 and 158. These channels receive rollers on the trolley assemblies, as best seen in FIG. 12, to which attention now is directed. This view illustrates how the runway 30 and trolleys are configured so that the upper and lower trolleys 50 and 52 can operate independently on the same segment at the same.

The upper trolley assembly 50 is shown in FIGS. 13-17. The upper trolley assembly 50 comprises a trolley 170, best seen in FIGS. 15 and 16. The trolley 170 may comprise a shallow U-shaped member 172 with downward flanges 174 and 176 that fits over the top of the runway 30. A plurality of rollers 180 are attached to trolley member 172. The rollers 180 may be supported on elongate roller bars 184 and 186 that are fixed to the flanges 174 and 176 of the trolley member 170. The roller members 180 are sized to fit in the upper trolley channels 152 and 154 (FIG. 11).

Also included in the upper trolley assembly is a trolley arm 190 sized to extend over the runway 30 a distance into the zone 10. While the shape and size of the trolley arm 190 may vary, it should be sized to comfortably house several service conduits (not shown) and to permit the placement at the distal end 192 of the arm a universal attachment member, such as the plate 194. Multiple bolts 196 may be included for attaching a service device to the plate 194.

Figure 15:
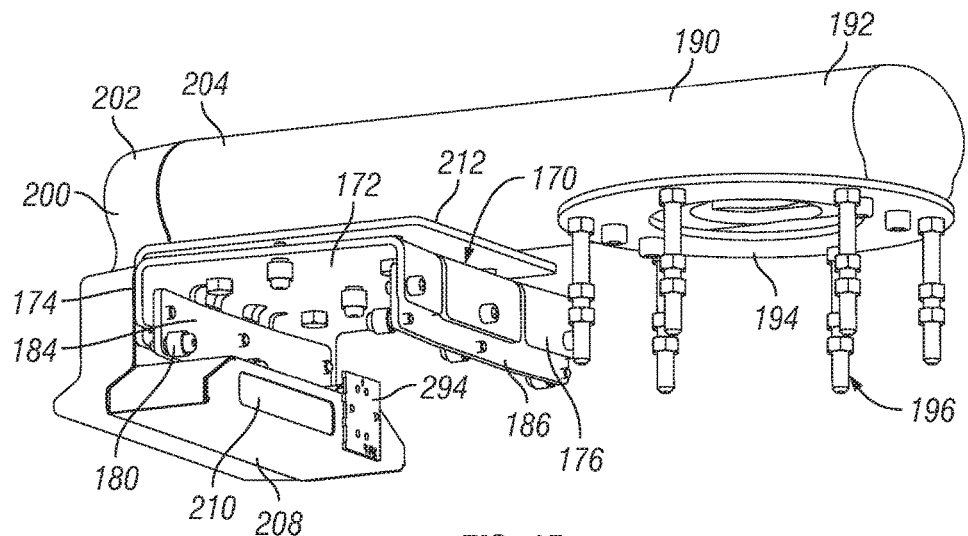
FIG. 15 is a lower perspective view of the upper trolley assembly apart from the runway and seen from inside the zone.
Figure 16:
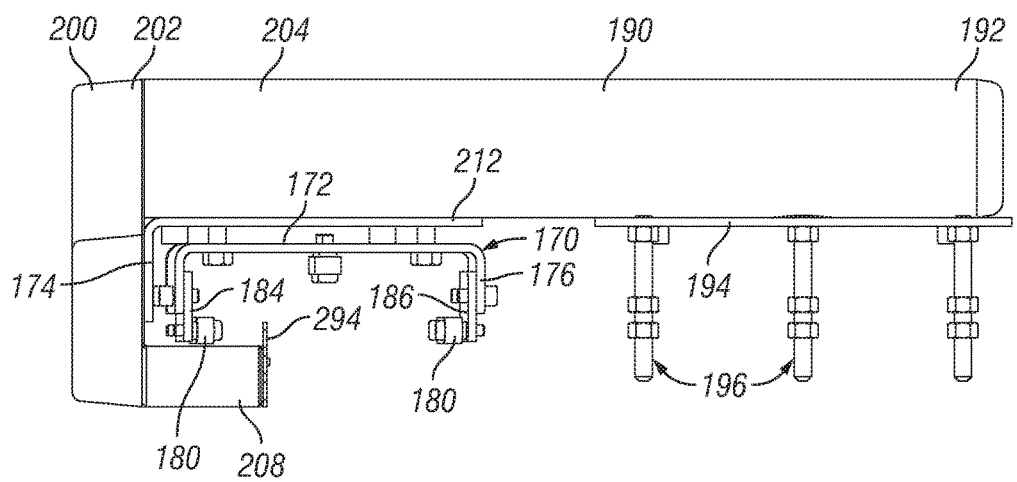
FIG. 16 is a side elevational view of the upper trolley assembly.
Figure 17:
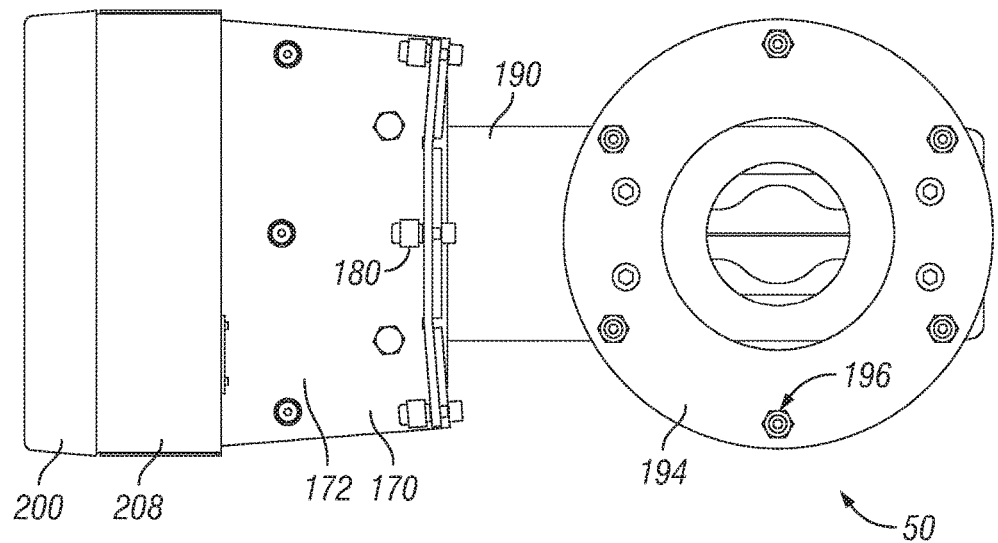
FIG. 17 is a bottom view of the upper trolley assembly.
Figure 18:
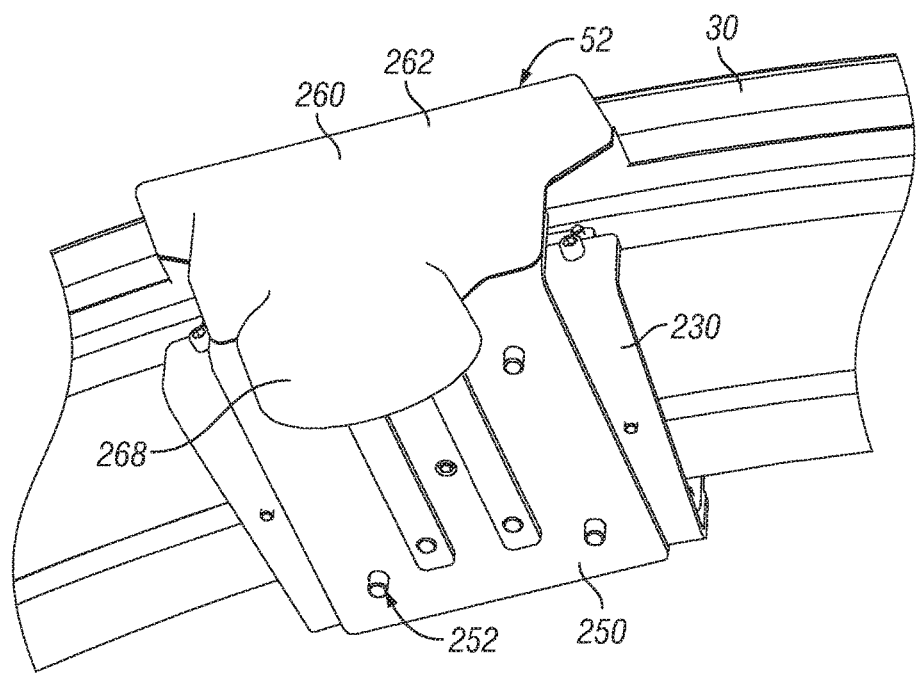
FIG. 18 is a lower perspective view of the lower trolley assembly mounted on the runway as seen from outside the zone.
Figure 19:
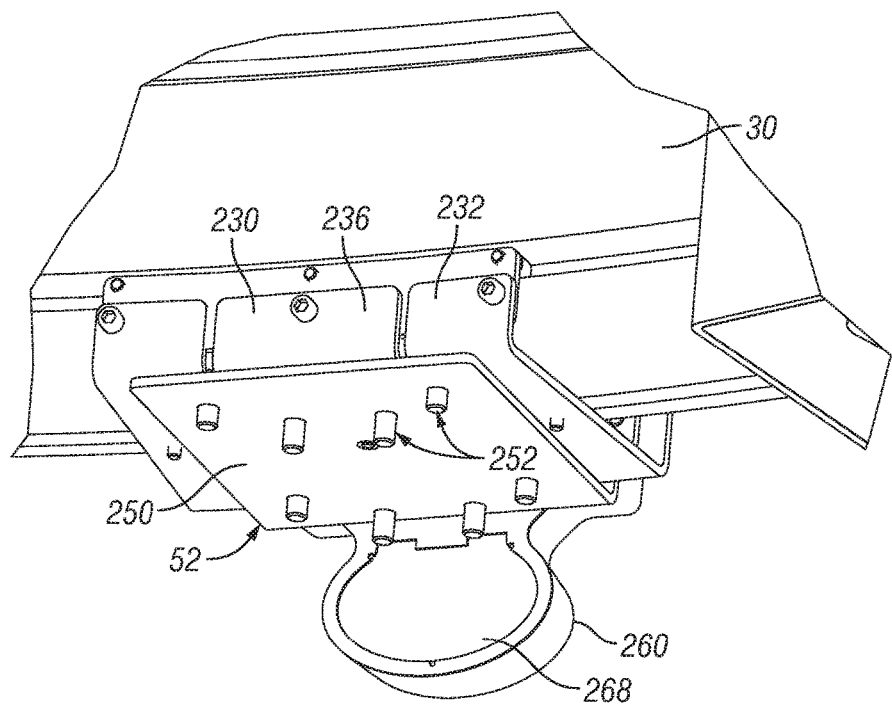
FIG. 19 is a lower perspective view of the lower trolley assembly mounted on the runway as seen from inside the zone.

Service conduits (not shown) will extend up from the runway 30 into the arm 190 and then into the attached service device. An upper trolley raceway 200 may be included to contain and channel the conduits from the runway 30 to the trolley arm 190. As best seen in FIGS. 15 and 16, the raceway 200 is a specially shaped end member with an upper portion 202 that mates to the proximal end 204 of the trolley arm 190 and lower portion 208 that fits inside runway, as shown in FIG. 12. A conduit slot 210 is provided in the lower portion 208 to allow the service conduits to enter the raceway 200. An L-shaped connection plate 212 is useful for securing together the trolley 170, the trolley arm 190, and the raceway 200. The side faces of the lower portion 208 may be slanted to ease movement inside the seal member 132 (FIG. 11). Thus, the service conduits generally follow the path identified by the dashed line 216 in FIG. 12.

The lower trolley assembly 52 is shown in FIGS. 18-22. The lower trolley assembly 52 comprises a trolley member 230 that is similar to the trolley member 170 described above. The trolley member 230 includes a shallow U-shaped member 232 with upwardly extending side flanges 234 and 236. Rollers 238, preferably mounted to roller bars 240 and 242, are mounted to the flanges 234 and 236. The rollers 238 ride in the lower trolley channels 156 and 158 (FIG. 11). Attached to the bottom of the trolley member 232 is a universal attachment member, such as the plate 250. Multiple bolts 252 may be included for attaching a service device to the plate 250.

Service conduits (not shown) will extend down from the runway 30 into the service device (not shown) secured to the attachment plate 250. A lower trolley raceway 260 may be included to contain and channel the conduits from the runway 30 to the device. As best seen in FIGS. 18-21, the raceway 260 is a specially shaped end member with an upper portion 262 that fits inside runway, as shown in FIG. 12. A conduit slot 264 is provided in the upper portion 262 to allow the service conduits to enter the raceway 260 from the runway 30.

Figure 21:
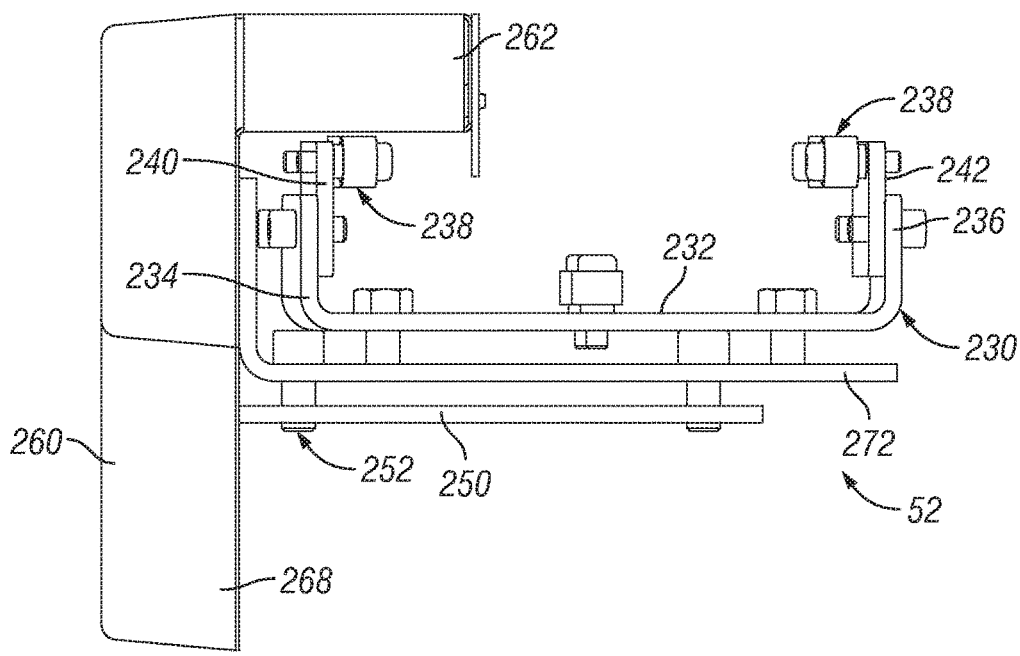
FIG. 21 is an end elevational view of the lower trolley assembly.
Figure 22:
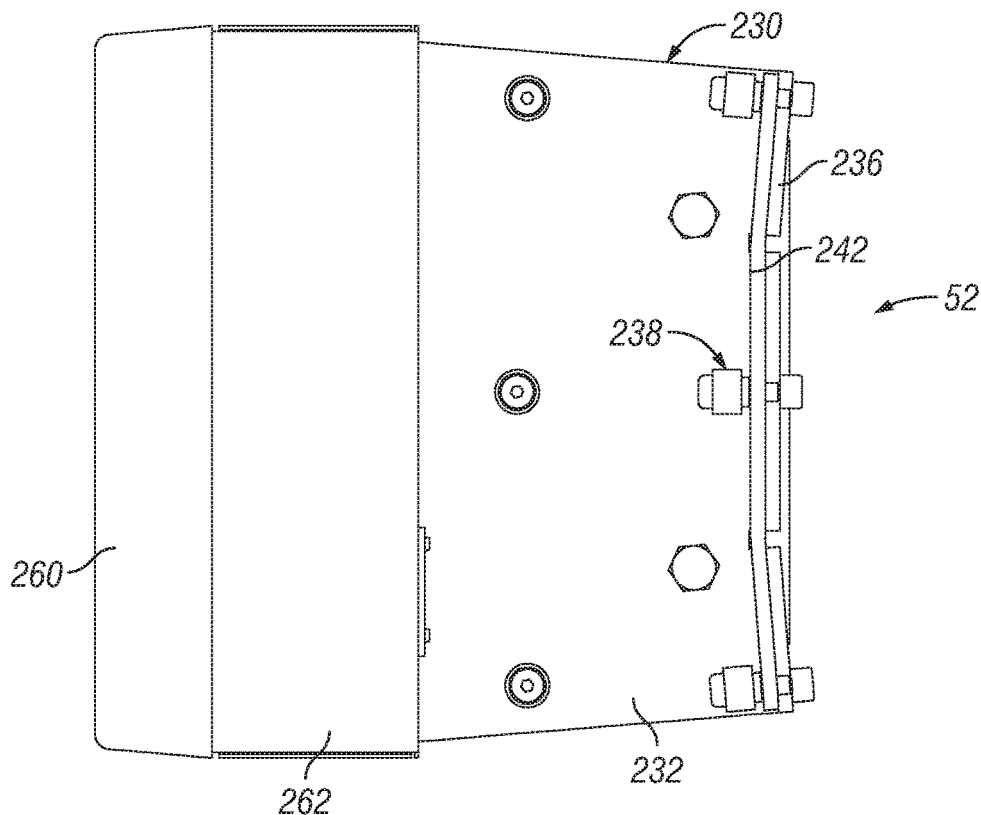
FIG. 22 is a plan view of the lower trolley assembly.

The raceway 260 also has a lower portion 268 that opens immediately below and beside the attachment plate 250 for directing the conduits to the attached device. An L-shaped connection plate 272, best seen in FIG. 21, is useful for securing together the trolley 230, the attachment plate 250, and the raceway 260. The side faces of the upper portion 262 may be slanted to ease movement inside the seal member 132 (FIG. 11). Thus, the service conduits generally follow the path identified by the dashed line 278 in FIG. 12.

Figure 20:
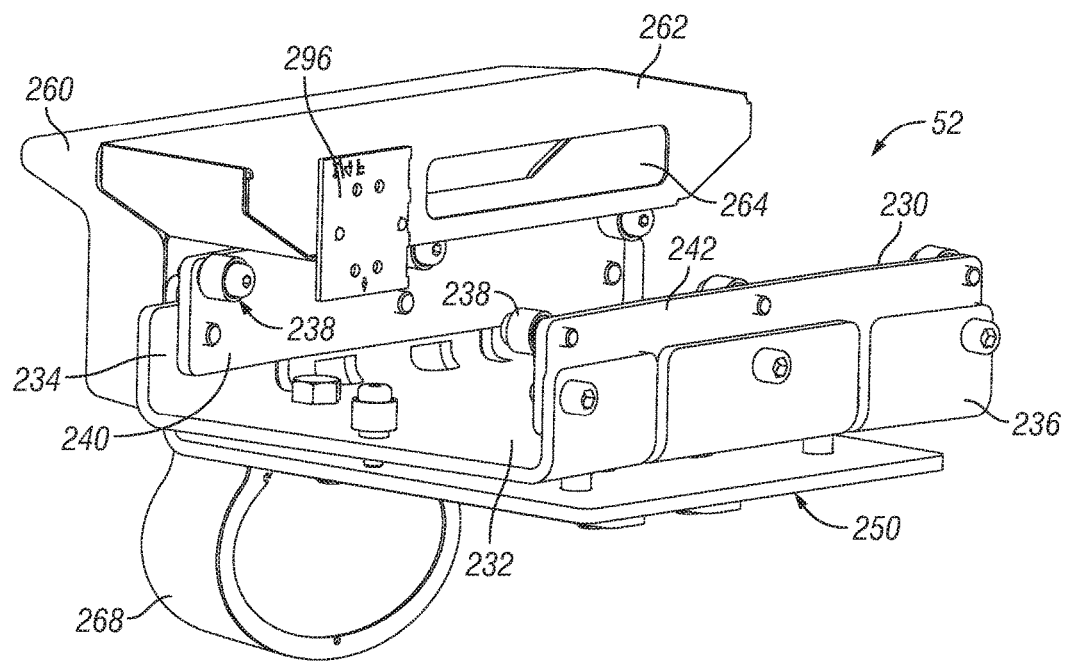
FIG. 20 is an upper perspective view of the lower trolley assembly apart from the runway.
Figure 23:
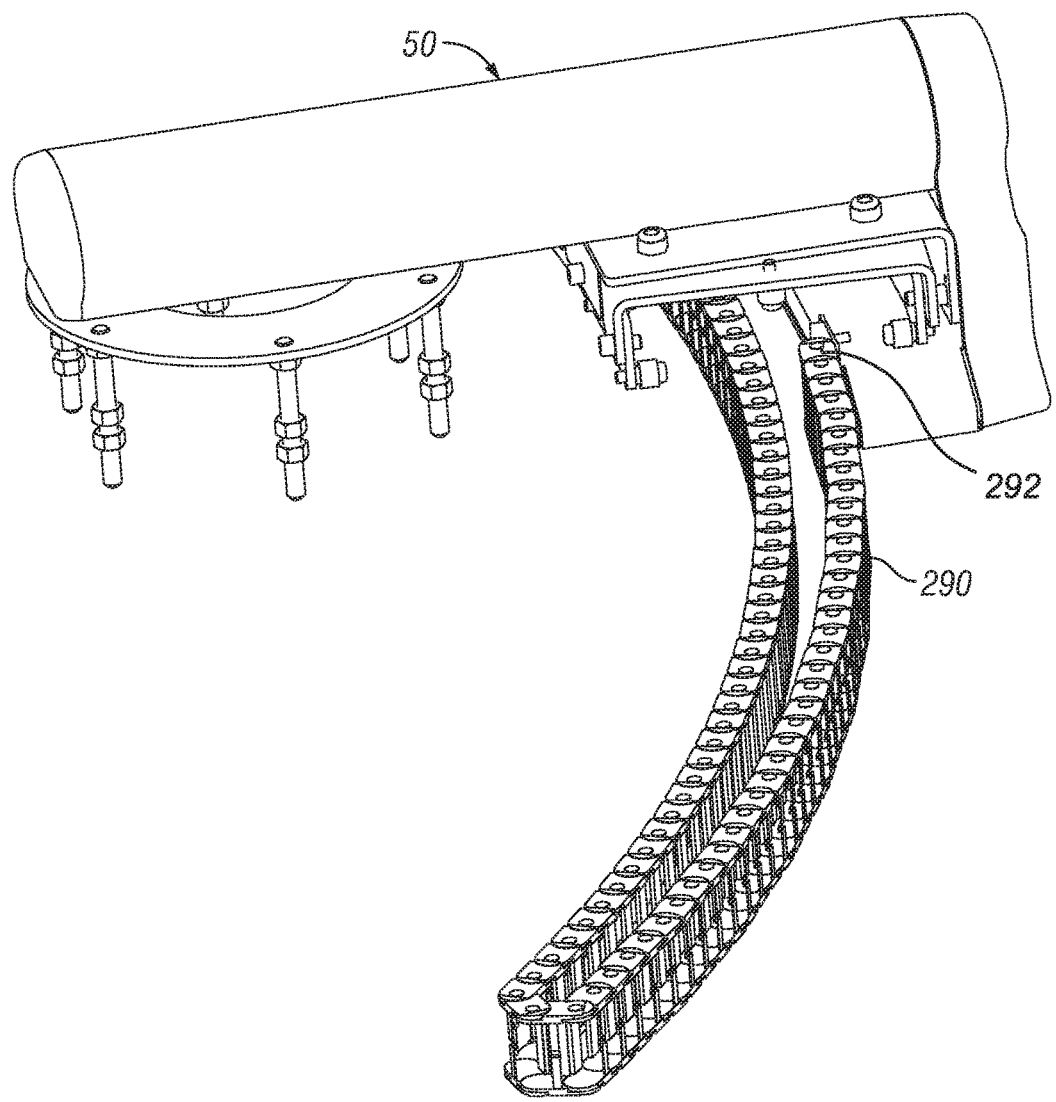
FIG. 23 is an upper perspective view of the upper trolley assembly showing the cable/conduit management system. The runway removed to clarify the illustration.

Now it will be apparent that the conduits must furl and unfurl as the trolley assemblies 50 and 52 move back and forth along the runway 30. To support and control the conduits, a conduit management system may be included. One suitable mechanism for this purpose is a flexible, open linkage 290, as shown in FIG. 23. One end 292 (FIG. 23) of the linkage 290 is attached to the movable trolley assembly. In the upper trolley assembly 50, the lower portion 208 of the raceway 200 is provided with a small link attachment plate 294 adjacent the slot 210, as shown best in FIG. 15. Similarly, in the lower trolley assembly 52, the upper portion 262 of the raceway 260 is provided with a similar plate 296 adjacent the slot 264, as best seen in FIG. 20.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An overhead equipment support system for supporting a plurality of medical service devices in a patient treatment zone, the patient treatment zone having a ceiling structure, the system comprising:
    a plurality of service hubs comprising a first service hub and a second service hub, each of the plurality of service hubs comprising:
        a housing having an upper end supportable from the ceiling structure;
        a plurality of medical service conduits installed inside the housing; and
        at least one service port in a side of the housing for passage of the plurality of medical service conduits therethrough;
    an extension arm rotatably mounted from at least one of the plurality of service hubs, the extension arm comprising at least one medical service conduit connecting to at least one of the plurality of medical service conduits in the at least one of the plurality of service hubs from which the extension arm is mounted, the extension arm further including an universal attachment member for connection to a first one of the plurality of medical service devices;
    a runway structurally connecting the first and second service hubs, the runway comprising:
        a conduit channel configured to contain at least one of the plurality of medical service conduits;
        at least one upper trolley channel;
        at least one lower trolley channel;
    an upper trolley assembly, comprising:
        an upper trolley mounted in the at least one upper trolley channel for travel on the runway;
        an upper trolley arm mounted on the upper trolley;
        an attachment member supported on the upper trolley arm for connection to a second one of the plurality of medical service devices;
        at least one medical service conduit extending between the attachment member and the runway;

a raceway for housing the at least one medical service conduit between the runway and the upper trolley arm; and a lower trolley assembly comprising:
- a trolley mounted in the at least one lower trolley channel for travel on the runway;
- an attachment member supported on the lower trolley for connection to a third one of the plurality of medical service devices;
- at least one service conduit extending between the runway and the attachment member; and
- a raceway for housing the at least one service conduit extending between the runway and the attachment member.

* * * * *

UNITED STATES PATENT AND TRADEMARK OFFICE
CERTIFICATE OF CORRECTION

PATENT NO. : 9,857,024 B1  
APPLICATION NO. : 15/376985  
DATED : January 2, 2018  
INVENTOR(S) : Taylor C. Culpepper Page 1 of 1

It is certified that error appears in the above-identified patent and that said Letters Patent is hereby corrected as shown below:

On the Title Page  
Item [56],  
Column 2, US Pat No. 6,629,386: replace "E04L 32/827" with --E04B 2/827--.  
Column 2, US Pat No. 2012/0281812: replace "A61L 36/4233" with --A61B 6/4233--.

In the Specification  
Column 1, Line 44: replace "are" with --area--.  
Column 2, Line 20: replace "from the outside" with --from outside--.  
Column 2, Line 63: replace "the area" with --area--.  
Column 3, Line 24: replace "This" with --This is--.  
Column 3, Line 28: replace "system'" with --system's--.  
Column 3, Line 29: replace "with is" with --is--.  
Column 4, Line 3: replace "comprises" with --comprise--.  
Column 4, Line 52: replace "20 a," with --20a,--.  
Column 5, Line 27: replace "6 0" with --60--.  
Column 5, Line 55: replace "a/or" with --and/or--.  
Column 5, Line 62: replace "described. The extension arm 40. As" with --described. As--.  
Column 5, Line 66: replace "with extension" with --with an extension--.  
Column 6, Line 61: replace "at the same." with --at the same time.--.  
Column 8, Line 16: replace "inventions" with --invention--.

Signed and Sealed this  
First Day of May, 2018

Andrei Iancu  
*Director of the United States Patent and Trademark Office*